(12) United States Patent
Howell et al.

(10) Patent No.: US 8,139,872 B2
(45) Date of Patent: Mar. 20, 2012

(54) SPLITTING FILE TYPES WITHIN PARTITIONED IMAGES

(75) Inventors: Jonathan R. Howell, Seattle, WA (US); Jeremy E. Elson, Kirkland, WA (US); John R. Douceur, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 916 days.

(21) Appl. No.: 12/147,594

(22) Filed: Jun. 27, 2008

(65) Prior Publication Data

US 2009/0324134 A1 Dec. 31, 2009

(51) Int. Cl.
*G06K 9/36* (2006.01)
*G06K 9/46* (2006.01)
*G06K 9/32* (2006.01)
*H04N 11/02* (2006.01)
*G06T 9/00* (2006.01)
*H04N 11/04* (2006.01)
*H04N 1/32* (2006.01)
*H04N 1/41* (2006.01)

(52) U.S. Cl. .................. 382/232; 382/294; 375/240.01; 345/555; 348/384.1; 358/426.01

(58) Field of Classification Search .................. None
See application file for complete search history.

(56) References Cited

U.S. PATENT DOCUMENTS

| | | | |
|---|---|---|---|
| 5,151,949 A | 9/1992 | Miyata | |
| 5,995,724 A | 11/1999 | Mikkelsen et al. | |
| 6,163,625 A | 12/2000 | Ng et al. | |
| 6,389,160 B1 | 5/2002 | Chui et al. | |
| 6,829,016 B2 | 12/2004 | Hung | |
| 6,853,755 B2 | 2/2005 | Li | |
| 6,992,789 B2 | 1/2006 | Czyszczewski et al. | |
| 7,039,247 B2 | 5/2006 | Iwamura | |
| 7,239,754 B2 | 7/2007 | Akimoto et al. | |
| 2004/0114800 A1 | 6/2004 | Ponomarev et al. | |
| 2005/0270311 A1* | 12/2005 | Rasmussen et al. | 345/677 |
| 2008/0084429 A1* | 4/2008 | Wissinger | 345/640 |

OTHER PUBLICATIONS

Stapleton, et al. A Three-Component Hybrid Image Compression Method. In: The 2006 International Conference on Image Processing, Computer Vision, and Pattern Recognition. http://ww1.ucmss.com/books/LFS/CSREA2006/IPC4037.pdf. Last accessed May 7, 2008, 6 pages.

McMillan, et al. A 3D Scene Graph Library, last modified Dec. 12, 2001. http://sgl.sourceforge.net/. Last accessed May 7, 2008, 11 pages.

MapMixer: How to Create a Hybrid Map http://www.ecopolis.org/rnapmixer-how-to-create-a-hybrid-map/. Last accessed May 7, 2008, 7 pages.

* cited by examiner

*Primary Examiner* — Randolph I Chu

(57) ABSTRACT

The claimed subject matter provides a system and/or a method that facilitates optimally and efficiently utilizing an image file format. A server can host an image that is partitioned into two or more tiles, wherein the two or more tiles collectively represent the image in entirety and are defined in at least one image file format. A tile generator can evaluate at least one tile to identify a suitable image file format based upon at least one of a characteristic of such file format or a context of a use for the tile. A browser can utilize the tile in the identified file format in order to render a portion of the image.

20 Claims, 11 Drawing Sheets

SPLITTING FILE TYPES WITHIN PARTITIONED IMAGES

BACKGROUND

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Each individual piece of data, standing alone, is generally not very informative. Database applications make data more useful because they help users organize and process the data. The database application allows the user to compare, sort, order, merge, separate and interconnect the data, so that useful information can be generated from the data. Yet, the capacity and versatility of databases have grown to an incredible amount to allow a virtually endless storage capacity utilizing databases. Moreover, typical database systems offer limited query-ability based upon time, file extension, location, and size. For example, in order to search the vast amounts of data associated to a database, a typical search is limited to a file name, a file size, a date of creation, wherein such techniques are deficient and inept.

With a continuing and increasing creation of data from end-users, the problems and difficulties surrounding finding, relating, and storing such data is reaching its peak. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, designing a compact disc label, all require the creation of data.

Today's computers and storage techniques (e.g., database, etc.) also allow utilization of data to generate and/or access various maps. For instance, Internet mapping applications allow a user to type in an address or address(es), and upon triggering a mapping application a map relating to an entered address and/or between addresses is displayed to a user together with directions associated with such map. The use of these maps have become commonplace—for instance, if the maps are displayed on a portable mechanism (e.g., a smartphone, a portable digital assistant (PDA), laptop, mobile device, etc.), they can offer insight or information about directions, locations, etc. With the large amounts of data, file types, and other options surrounding mapping applications, numerous aspects can be adjusted in order to increase efficiency of access, downloading, etc.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate selecting a particular file format for use based on an advantage associated with the selected file format. A tile generator can optimally encode a tile into an image file format based on evaluation of the content of the tile. In general, the tile generator can select a particular file format for data based upon analysis of at least one of the file format available, a characteristic of the file format, a content of the data, and/or a context of the use for the data. An image can be partitioned into a subset of tiles, wherein the collection of tiles can be representative of the entire image. By encoding the tiles into a particular image file format, the tile generator can leverage benefits or advantages of specific file formats while mitigating disadvantages or deficiencies.

The tile generator can encode an image tile in at least one of a PNG file format or a JPEG file format. A browser can receive the tile in the encoded file format via a server or the tile generator. In one aspect, the browser can request each tile in a particular format. In another aspect, the browser can receive a manifest which can define each tile and respective file format. In still another aspect, the tile can be formatted into a generic file extension. The browser can further render the tile in the encoded file format in order to display a portion of the image. In other aspects of the claimed subject matter, methods are provided that facilitate rendering an image in a specific format based at least in part upon an evaluation of an advantage of such file format and a characteristic related to an employment of such file format.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
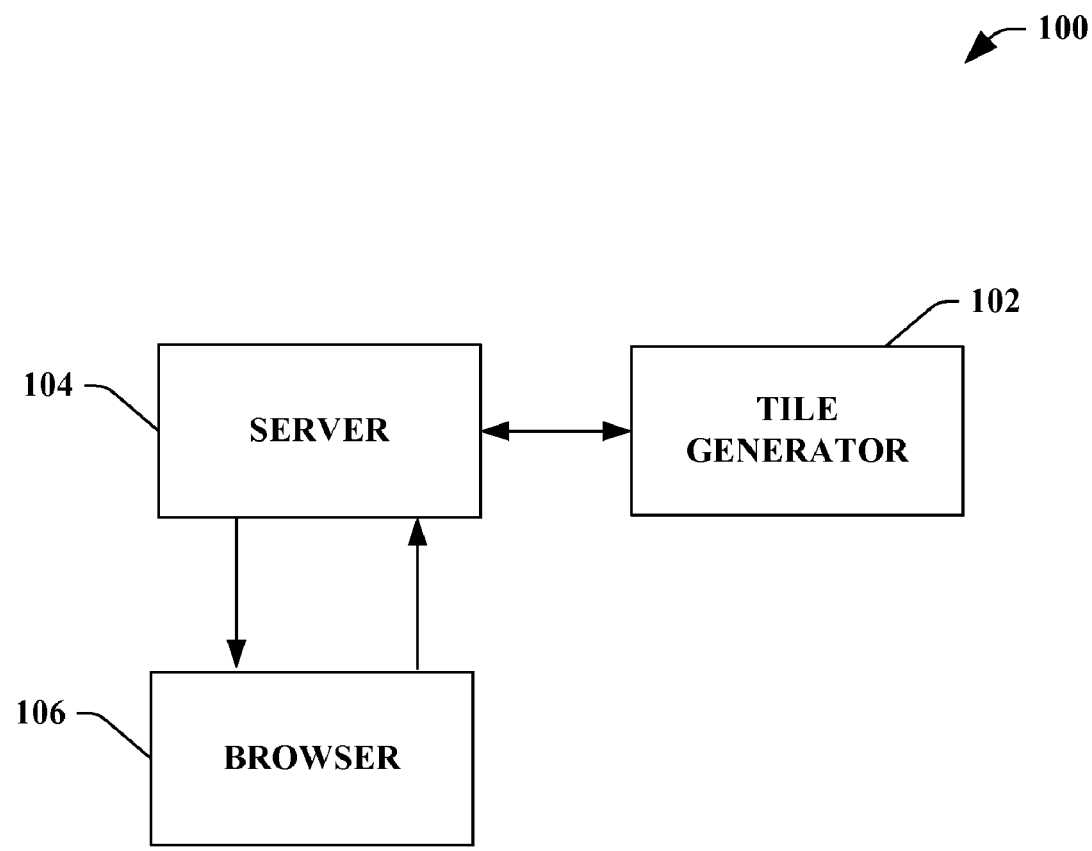
FIG. 1 illustrates a block diagram of an exemplary system that facilitates selecting a particular file format for use based on an advantage associated with the selected file format.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "server," "generator," "browser," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates selecting a particular file format for use based on an advantage associated with the selected file format. The system 100 can include a tile generator 102 that can select a particular data or file format based at least in part upon a characteristic of the data or file format or a context of a use for the data file format. In particular, the tile generator 102 can identify and utilize a particular image file format in order to leverage a benefit for such image file format or to mitigate a deficiency of such image file format. In an image file format example, the tile generator 102 can evaluate a tile (e.g., a segmented or partitioned portion of an image, etc.) in order to utilize a particular image file format. Based upon such evaluation, the tile (in the selected file format) can be communicated from a server 104 and/or the tile generator to a browser 106.

For instance, an image can be partitioned or segmented into tiles, wherein an entire collection of the tiles can represent the image as a whole or in entirety. It is to be appreciated that the tiles can be in any suitable file format associated with photography, imagery, graphics, and the like. By segmenting or partitioning the image, efficiency can be improved in regards to loading, rendering, communicating, and the like since the complete image is typically very large in data size. Yet, the system 100 can enable an optimal selection of an image file format for the tile(s) based upon at least one of characteristics of the tile, available file formats, and/or context of use for the tiles. In other words, the tile generator 102 can enable efficient implementation of data or file formats.

It is to be appreciated and understood that the subject innovation can be utilized with any suitable file or data format. In other words, the claimed subject matter can include an optimal selection between a first data format with at least one respective characteristic and a second data format with at least one respective characteristic based at least in part upon an evaluation of at least one of a first data format characteristic, a second data format characteristics, and/or a context of a use for the data. Thus, the tile generator 102 can enable a selection of a file format based upon the content of the file format, a characteristic indicative of such file format, a context of employment of the file format, and/or any other suitable criteria related to the file format.

The tile generator 102 can further evaluate content of data (e.g., a tile, etc.) in order to determine a suitable file format. By examining the content or regions of the data (e.g., content which is displayed or contained within the tile representative of the portion of the image, etc.), the tile generator 102 can enforce or assign a particular file format for that specific tile. Such enforcements and/or definitions can be communicated to the browser 106 for rendering in various manners. In one example, the browser 106 can request (e.g., to the server 104, the tile generator 102, etc.) a first file format and the response can be reflective of the optimally selected file format (discussed in more detail below). In another example, a manifest can be communicated (e.g., from the server 104, the tile generator 102, etc.) to the browser 106, wherein the manifest can include definitions related to data and respective file formats (discussed in more detail below). In another example, the data can be packaged or formatted into a generic file extension that can be automatically translated by the browser 106, which in turn, enables the optimally selected file format to be employed for the data.

In addition, the system 100 can include any suitable and/or necessary interface component (not shown), which provides various adapters, connectors, channels, communication paths, etc. to integrate the tile generator 102 into virtually any operating and/or database system(s) and/or with one another.

In addition, the interface component can provide various adapters, connectors, channels, communication paths, etc., that provide for interaction with the tile generator 102, the server 104, the browser 106, and any other device and/or component associated with the system 100.

Figure 2:
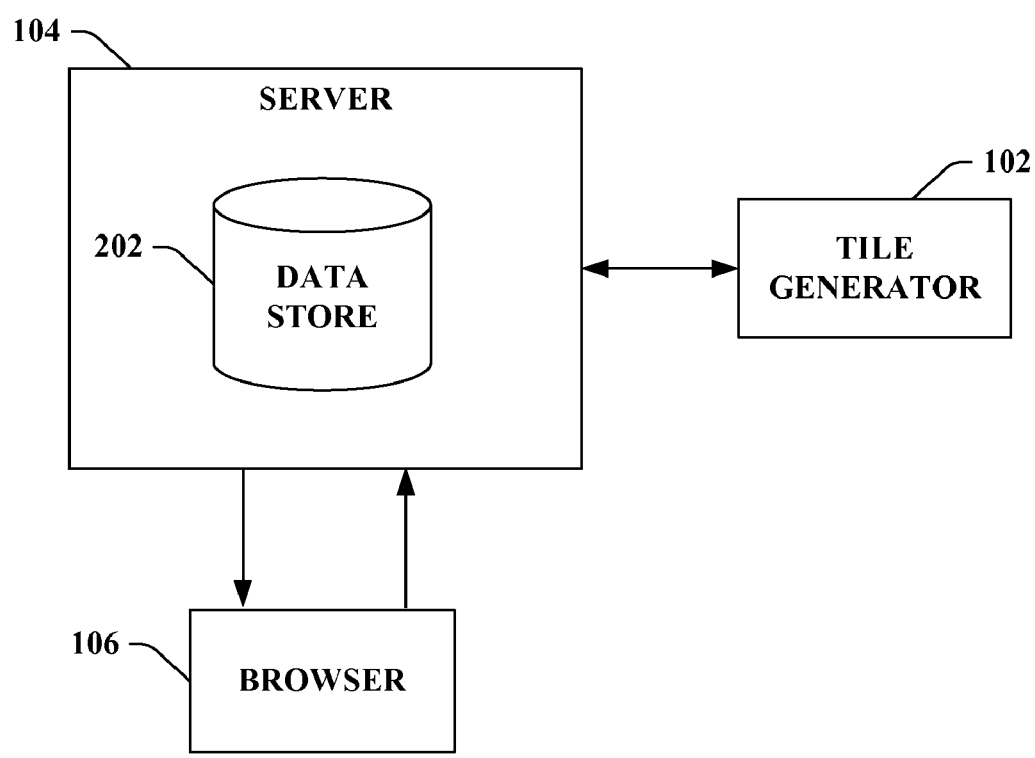
FIG. 2 illustrates a block diagram of an exemplary system that facilitates providing a portion of an image in a particular format to a browser.

FIG. 2 illustrates a system 200 that facilitates providing a portion of an image in a particular format to a browser. The system 200 can include the tile generator 102 that can evaluate content of a tile associated with the server 104 in order to select a particular image file format to enable the browser 106 to render such tile in the file format, wherein the tile can be representative of a portion of an image. By evaluating the content of the tile, the tile generator 102 can select an appropriate image file format (e.g., file format that suites the context, the advantages, the deficiencies, etc.).

In a particular example, the tile generator 102 can optimally select an image file format for a tile in which the image file format is selected between a portable network graphic (PNG) file format and a joint photographic expert group (JPEG) file format. The PNG file format can include an advantage in regards to transparency (e.g., an alpha layer, etc.). On the other hand, the PNG file format is not well suited for data compression of images. The JPEG file format is advantageous in regards to data or file compression. Yet, the JPEG file format does not include capabilities related to transparency (e.g., an alpha layer, etc.). The subject innovation can enable an optimal selection between utilizing a tile in a PNG file format or a JPEG file format based at least in part upon evaluating the content of the tile, the context of use for the tile, and/or characteristics of each available file formats. In other words, the claimed subject matter can utilize a hybrid or combination of the JPEG file format and the PNG file format in order to exploit the benefit/advantage of each file format while mitigating deficiencies associated with each.

For instance, the content of a tile can be evaluated in order to identify if the tile includes a transparent region or if the tile includes a region with a substantial amount of opaqueness. When a region within the tile includes transparency, the tile can be defined, assigned, or encoded as a PNG file format based at least in part upon the PNG file format having transparency ability (e.g., an alpha layer, etc.). When a region within the tile includes a portion of opaqueness, is substantially opaque, or is completely opaque, the tile can be defined, assigned, or encoded as a JPEG file format based at least in part upon the JPEG file format having no transparency ability while having advantageous data compression abilities. Thus, the implementation of the JPEG and PNG file formats is enhanced since the advantage of transparency and/or data compression is combined for image tiles.

The system 200 can further include a data store 202 that can include any suitable data utilized or interacted with by the tile generator 102, the server 104, the browser 106, etc. For example, the data store 202 can include, but not limited to including, file formats, image file formats, characteristics of file format, tile data, image data, user preferences, user configurations, browser settings, server settings, map data, map imagery, map overlay, JPEG information, PNG information, manifest data, tile encoding definitions, tile association to image data (e.g., tile placement in respect to the entire image), generic file extension data, translation data related to generic file extensions, username, passwords, security data, authentication data, images, photographs, server data, etc. Moreover, although the data store 202 is depicted to be incorporated into the server 104, it is to be appreciated that the data store 202 can be a stand-alone component, incorporated into the tile generator 102, incorporated into the browser 106, and/or any suitable combination thereof.

It is to be appreciated that the data store 202 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 202 of the subject systems and methods is intended to comprise, without being limited to, these and any other suitable types of memory. In addition, it is to be appreciated that the data store 202 can be a server, a database, a hard drive, a pen drive, an external hard drive, a portable hard drive, and the like.

Figure 3:
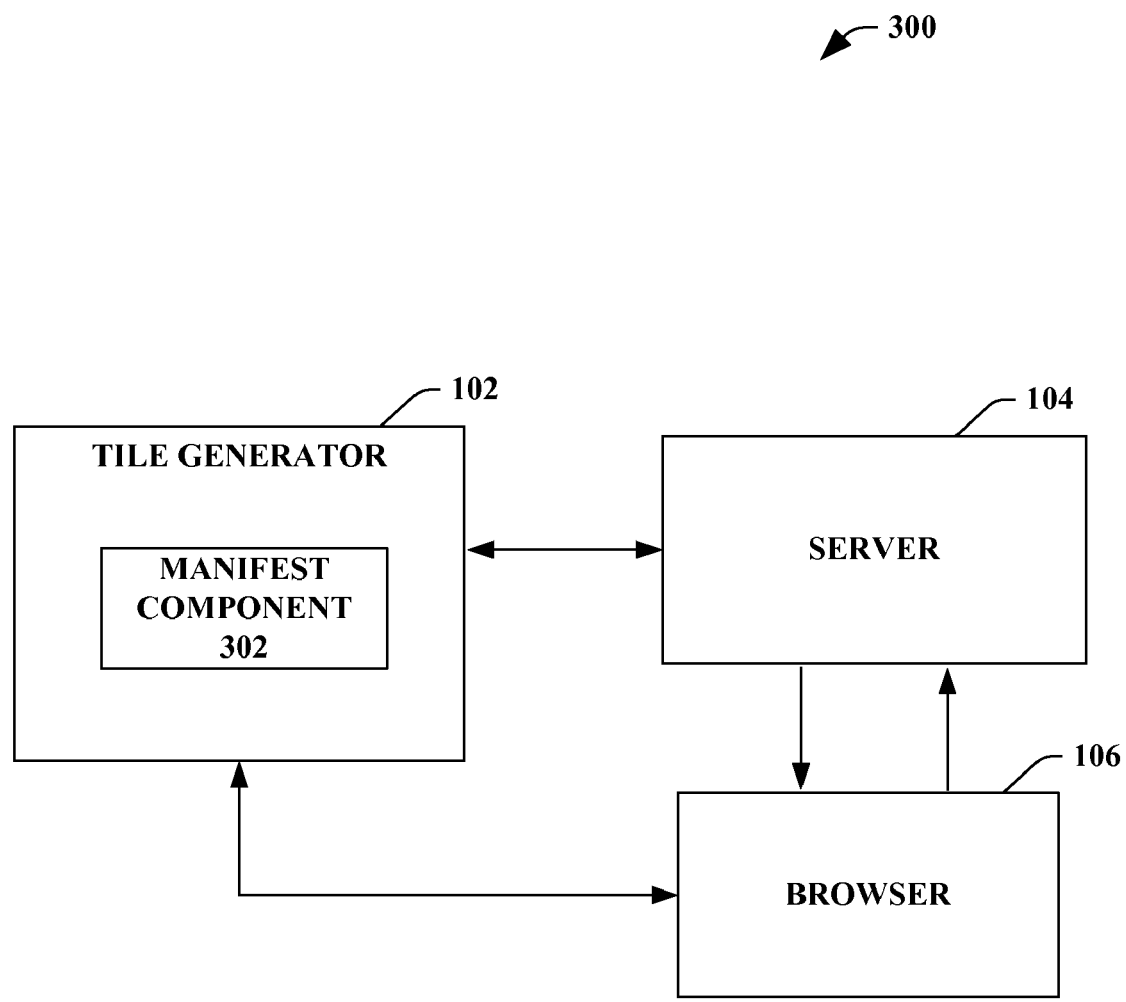
FIG. 3 illustrates a block diagram of an exemplary system that facilitates rendering an image in a specific format based at least in part upon an evaluation of an advantage of such file format and a characteristic related to an employment of such file format.

FIG. 3 illustrates a system 300 that facilitates rendering an image in a specific format based at least in part upon an evaluation of an advantage of such file format and a characteristic related to an employment of such file format. The system 300 can include the tile generator 102 that can encode a tile representative of a portion of an image into a particular file format based upon an evaluation of at least one of the file format or the content of the tile. Upon encoding the tile into a file format, the browser 106 can receive the tile for rendering from the server 104.

In general, the browser 106 can allow interaction or access with a portion of the data (e.g., tile, image, file format, etc.) across a network, server, the web, the Internet, cloud, and the like. It is to be appreciated that the browse component 302 can be any suitable data browsing component such as, but not limited to, a potion of software, a portion of hardware, a media device, a mobile communication device, a laptop, a browser application, a web browser, a smartphone, a portable digital assistant (PDA), a media player, a gaming device, and the like.

Browsers can support image types, in which each image type can include a specific advantage. In particular, the PNG image type can display images with transparency (e.g., an alpha layer), and the JPEG image type can compress natural images in order to achieve compression rations an order of magnitude better than those achieved by PNG. When displaying a very large logical image (e.g., a map overlay, etc.), the image can be partitioned into a plurality of smaller image tiles. When the tiles are laid out in the appropriate order (e.g., tile location definition, etc.) and displayed by the browser 106, an uninterrupted portion of the entire logical image can be displayed. Scrolling the display can fill in the newly-exposed portions for the logical image by fetching the additional or appropriate tiles.

In one example, the system 300 can allow tiles of the logical image to be stored in different formats depending on whether the individual tile requires transparency. Generally, a border tile can include transparency and a majority of tiles showing the interior parts of the logical image can be substantially opaque.

In accordance with an aspect of the subject innovation, the tile generator 102 can evaluate the content of a tile in order to determine if transparency is within a region of the tile. If transparency exists, the tile generator 102 can encode the tile into the PNG file format. If no transparency exists, the tile generator 102 can encode the tile into the JPEG file format.

The system 300 can communicate the tiles in the selected and/or encoded file format to the browser 106. For example, a client (e.g., the browser 106) can request a tile in the JPEG file format. The server 104 can respond with either the tile in the JPEG file format or a response indicating the tile in that file format is not found (e.g., "file not found," "incorrect tile format," etc.). If the response received by the browser 106 indicates the tile is not existent, the browser 106 or client can request the next file format. Here, the next file format to request is the PNG file format. Yet, this approach can include an extra round-trip time between the client (e.g., the browser 106) and the server 104. In some cases, this delay can negate the benefit of utilizing the compression benefits of the JPEG file format. In an example involving maps data, tiles related to a map overlay can be JPEG images. Yet, the map is typically rendered in a zoomed-out version of the map or image, in which the tiles can be border tiles (e.g., include transparency). In other words, tile requests in such situations can be for PNG images (e.g., incurring extra-round trips frequently).

The system 300 can further include a manifest component 302 that can generate a manifest or definition set that includes a listing of file formats for each portion of data. In particular, the manifest component 302 can include an image file format (e.g., JPEG, PNG, etc.) for each image tile representative of a logical image. It is to be appreciated that the manifest component 302 can generate the manifest based upon evaluations of at least one of the data (e.g., the tile, etc.), a file format, a file format characteristic, and/or a context of use for the data. Moreover, the manifest can be any suitable text, audio, graphic, image, data, document, file, etc. that can communicate the file format for a particular portion of data or tile.

In an example, the manifest component 302 can create a manifest file that can specify which tiles are encoded in which format. The browser 106 can load this manifest from the server 104 prior to requesting tiles. This manifest can further be used by the browser 106 to determine whether to request a tile in a JPEG file format or a PNG file format. Yet, this manifest can be large in data size and thus introduce an undesirable startup delay prior to the image (e.g., map, map overlay, etc.) can be rendered. Additionally, the manifest can be tiled and loaded portion by portion or on demand. However, this technique can generate further complexity and introduce additional round-trips between the browser 106 and the server 104.

In still another example, the server 104 can wrap the image in a file container that can include information indicating the file type of the content. Yet, commodity browsers may not provide a way to unwrap an image from such a container utilizing, for instance, hypertext markup language (HTML) or JavaScript. It is to be appreciated that other browser extension languages, such as Java or Flash, can enable this approach. Yet, the subject innovation can be utilized with unmodified commodity web browsers and/or servers. Thus, the wrap technique can be utilized with a modified browser.

Figure 4:
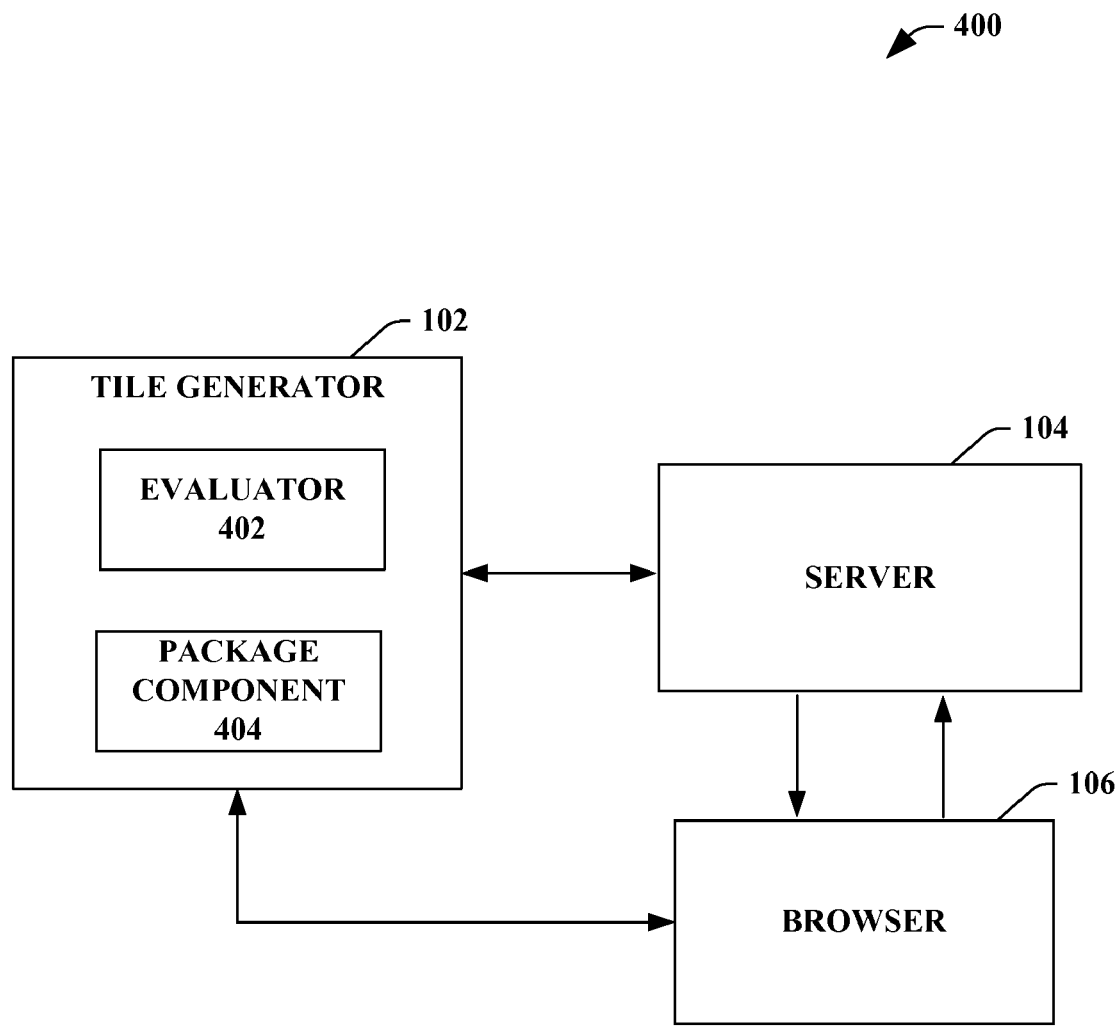
FIG. 4 illustrates a block diagram of an exemplary system that facilitates efficiently rendering a plurality of images by leveraging advantages of two or more file formats.

FIG. 4 illustrates a system 400 that facilitates efficiently rendering a plurality of images by leveraging advantages of two or more file formats. The system 400 can include the tile generator 102 that can select an image file format for a tile based upon an analysis of such tile and/or available image file formats. Generally, the tile generator 102 can optimize the employment of an image file format by intelligently selecting an image file format in light of the characteristics associated with an image file format. By identifying a beneficial image file format, advantages of suitable image file formats can be magnified and deficiencies of suitable image file formats can be mitigated.

The tile generator 102 can include an evaluator 402 that can provide analysis of at least one of a portion of data (e.g., an image, a tile, etc.), a file format, a characteristic of a file format (e.g., an advantage, a deficiency, etc.), and/or a context of use for the data. In particular, the evaluator 402 can determine a file format for a tile, wherein the file format can be a JPEG format or a PNG format. For example, a PNG format is more suited for a tile that includes transparent regions, whereas a JPEG format is more suited for a tile with no transparent regions (e.g., no transparent regions can allow the JPEG formatted tile to be more compressed in data size).

The tile generator 102 can further include a package component 404 that can format the tile with a generic file extension. For example, the evaluator 402 can identify and select a file format for a tile (e.g., the selected file format) and the tile generator 102 can encode the tile into such selected file format. Upon selection of the format, the package component 404 can format the tile in the selected file format in order to communicate such tile to the browser 106. The generic file extension can be any suitable file extension that is not affiliated with at last one of an application, a portion of software, a portion of hardware, a device, etc. In other words, the tile can include the generic file extension that can be a common ambiguous extension or server type label that does not designate the data (e.g., the tile) with a particular data type. The package component 404 can format the tile into the generic file extension such that upon receipt, the browser 106 can automatically translate the generic file extension and determine the tile and/or selected file format.

For instance, a server (e.g., the server 104) can store tile files in a file format (e.g., JPEG, PNG, etc.) with a common, ambiguous extension (e.g., a generic file extension). It is to be appreciated that the generic file extension can be any file extension that is not associated or affiliated with a data type (e.g., such as "tile-0.ipic," where "tile-0" is the file name and ".ipic" is the generic file extension that is not related to a data type). A server (e.g., a commodity server, etc.), when transmitting such a file to the client, can label it with a file type ("MIME-Type") not associated with any image format. A browser (e.g., a commodity browser) can not associate any image format with such extension. Thus, the browser (e.g., the browser 106, a commodity browser, etc.) can automatically examine the image file contents in order to determine the image file type upon receipt or instruction to display an image. Therefore, when rendering an image or a tile, the browser (e.g., the browser 106) can ignore at least one of the unaffiliated generic file extension, the file type information sent by the server, etc. and display the image appropriately regardless of the type of the data in the file.

It is to be appreciated that the above example does not increase the interactions between the client (e.g., the browser 106) and the server 104, nor does any change in a client or server need to be implemented other than utilizing the tile generator 102. Furthermore, it is to be appreciated that the tile filenames can use the ".jpg," or ".png" extension rather than an ambiguous extension (e.g., such as ".ipic" as suggested above) as the browser 106 can render the tile correctly even if the file extension (or server type label) mismatches the file data. However, the use of a distinguished extension or generic file extension (e.g., an extension unassociated or affiliated with a data type, ".ipic," etc.) can be employed.

Figure 5:
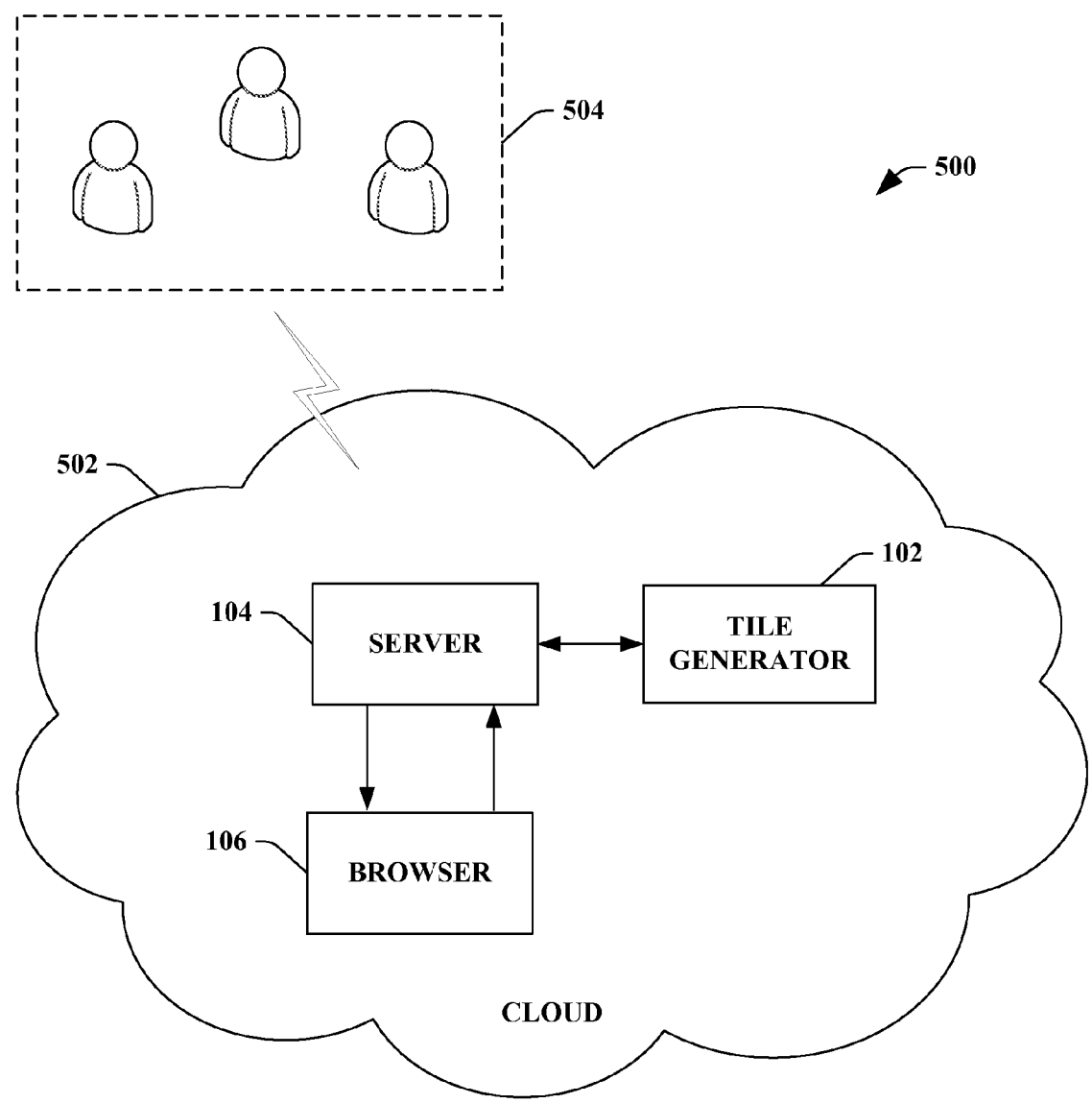
FIG. 5 illustrates a block diagram of exemplary system that facilitates enhancing utilizing two or more particular file formats based on an advantage associated with a selected file format.

FIG. 5 illustrates a system 500 that facilitates enhancing utilizing two or more particular file formats based on an advantage associated with a selected file format. The system 500 can further utilize a cloud 502 that can incorporate at least one of the tile generator 102, the server 104, the browser 106, and/or any suitable combination thereof. It is to be appreciated that the cloud 502 can include any suitable component, device, hardware, and/or software associated with the subject innovation. The cloud 502 can refer to any collection of resources (e.g., hardware, software, combination thereof, etc.) that are maintained by a party (e.g., off-site, on-site, third party, etc.) and accessible by an identified user 504 over a network (e.g., Internet, wireless, LAN, cellular, Wi-Fi, WAN, etc.). The cloud 502 is intended to include any service, network service, cloud service, collection of resources, etc. and can be accessed by an identified user via a network. For instance, two or more users (e.g., users 504) can access, join, and/or interact with the cloud 502 and, in turn, at least one of the tile generator 102, the server 104, the browser 106, and/or any suitable combination thereof. In addition, the cloud 502 can provide any suitable number of service(s) to any suitable number of user(s) and/or client(s). In particular, the cloud 502 can include resources and/or services that evaluate at least one of a data format and a situation for employment in order to optimally select such data format. In particular, a user can interact with a portion of data via the cloud, wherein the cloud can automatically utilize a particular format for a portion of data based on an advantage related to the particular format and/or a use for such data.

Figure 6:
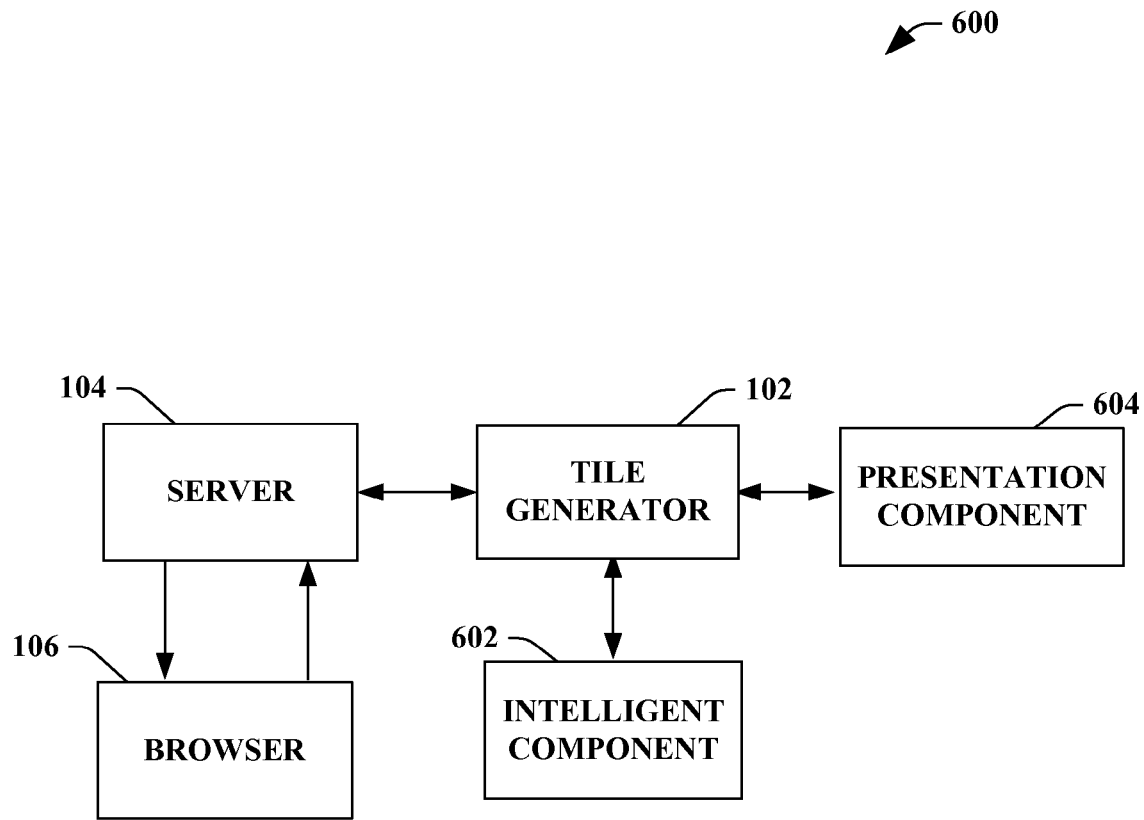
FIG. 6 illustrates a block diagram of an exemplary system that facilitates automatically evaluating and identifying a particular format for a portion of tiled imagery.

FIG. 6 illustrates a system 600 that employs intelligence to facilitate automatically evaluating and identifying a particular format for a portion of tiled imagery. The system 600 can include the tile generator 102, the server 104, and/or the browser 106, which can be substantially similar to respective generators, servers, and browsers described in previous figures. The system 600 further includes an intelligent component 602. The intelligent component 602 can be utilized by the tile generator 102 to facilitate optimally selecting and implementing a particular data format associated with images. For example, the intelligent component 602 can infer a file format to encode data, an image file format to encode a tile, tile location definitions, characteristics of file format, a generic file extension, a content of a tile, an amount of transparency within a tile, an amount of opaqueness within a tile, a manifest, map data, map overlay data, content of a tile related to a map image, etc.

The intelligent component 602 can employ value of information (VOI) computation in order to identify a particular data format. For instance, by utilizing VOI computation, the most ideal and/or appropriate file format for data can be determined in each particular case/situation and/or for each particular user/entity. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The tile generator 102 can further utilize a presentation component 604 that provides various types of user interfaces to facilitate interaction between a user and any component coupled to the tile generator 102. As depicted, the presentation component 604 is a separate entity that can be utilized with the tile generator 102. However, it is to be appreciated that the presentation component 604 and/or similar view components can be incorporated into the tile generator 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the tile generator 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
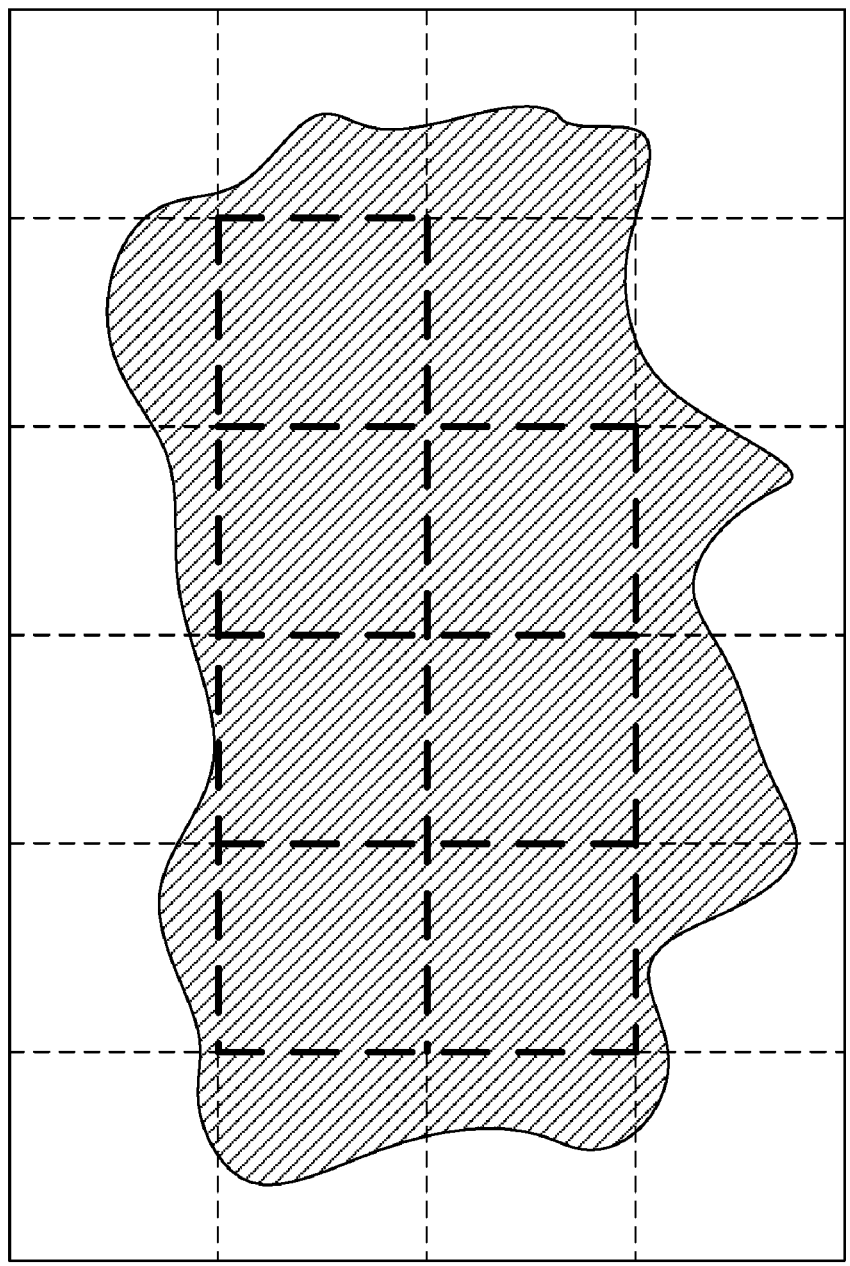
FIG. 7 illustrates an exemplary tiling process for an image in accordance with the subject innovation.

FIG. 7 illustrates a tiled image 800 in connection with the subject innovation. It is to be appreciated the image 800 and the tiling process depicted is for illustrative purposes only and not to be limiting on the subject innovation. The image 800 can be divided or tiled into a 4-by-6 array of 24 tiles (e.g., shown by the dotted lines). Heavy dotted lines in the middle indicate 7 tiles that include no transparent regions and are thus able to be encoded as JPEG. Since the remaining 17 tiles include transparent regions, such tiles can be encoded as PNG.

Figure 8:
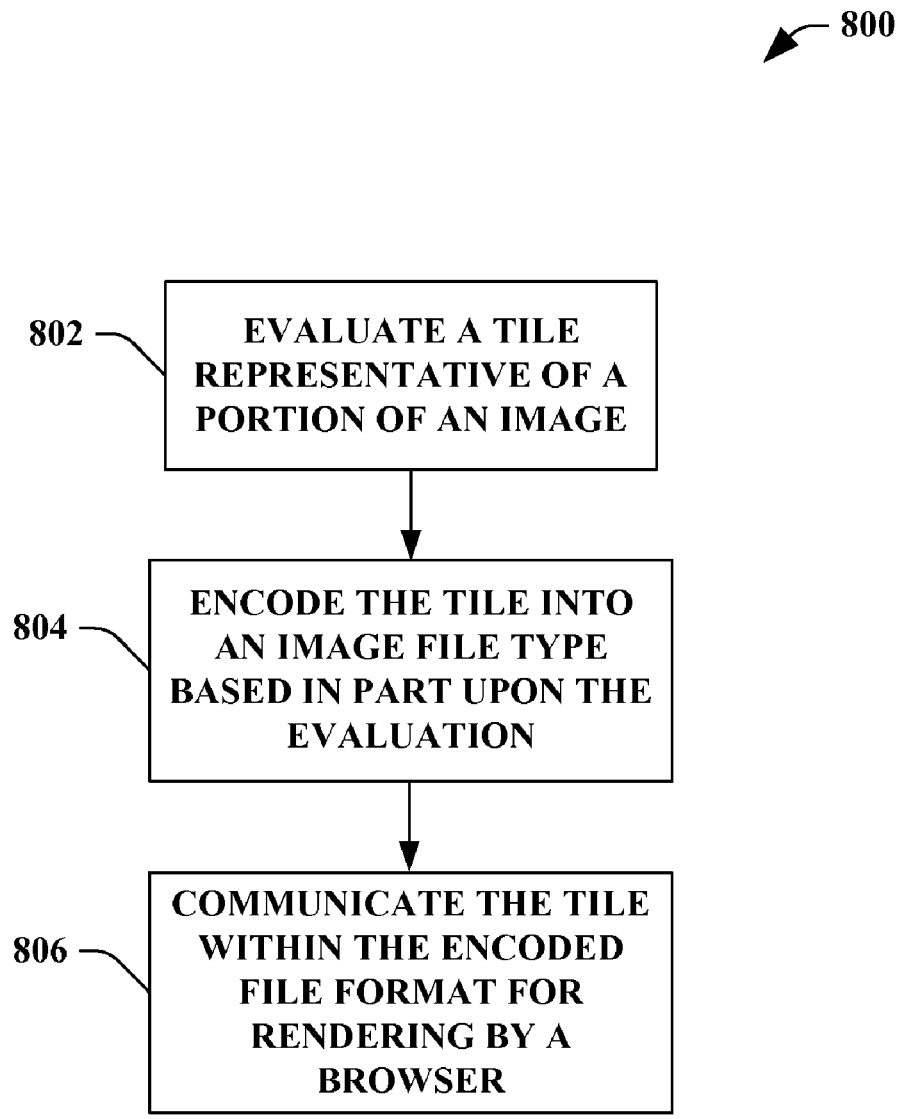
FIG. 8 illustrates an exemplary methodology for selecting a particular file format for use based on an advantage associated with the selected file format.
Figure 9:
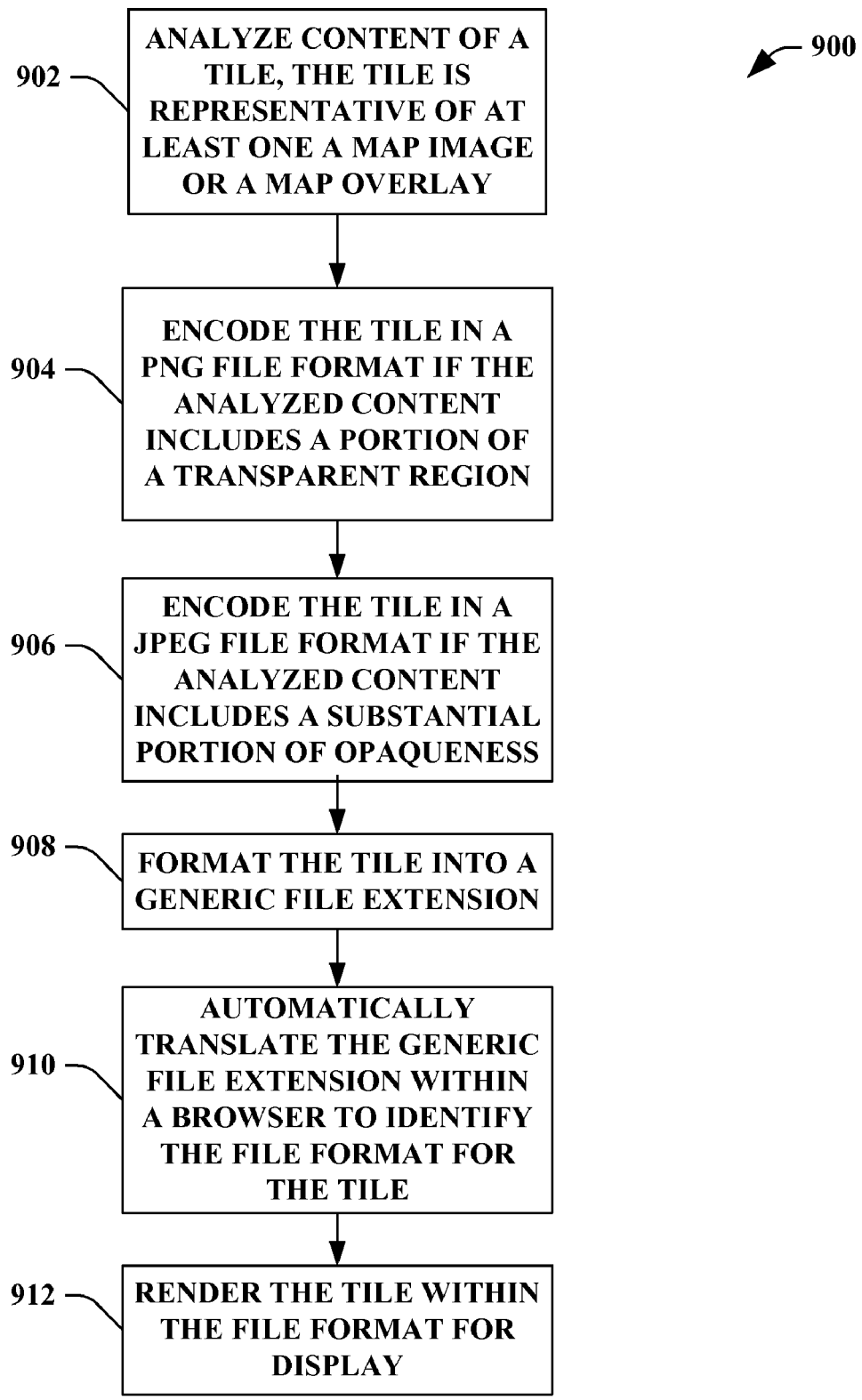
FIG. 9 illustrates an exemplary methodology that facilitates efficiently rendering a plurality of images by leveraging advantages of two or more file formats.

FIGS. 8-9 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a method 800 that facilitates selecting a particular file format for use based on an advantage associated with the selected file format. At reference numeral 802, a tile representative of a portion of an image can be evaluated. In general a tile can be a partition of an image, wherein the collection of tiles can be indicative of the image as a whole or in its entirety. The evaluation of the tile can include, but is not limited to including, an analysis of content of the tile (e.g., portion of the image represented, etc.), an available format for the tile (e.g., file type, data type, etc.), a characteristic of the available tile format (e.g., a benefit, a deficiency, a compression ratio, a transparency capability, etc.), a context of use for the tile, etc.

At reference numeral 804, the tile can be encoded into an image file type based at least in part upon the evaluation. In particular, a tile can be encoded in a PNG file format or a JPEG file format based at least in part upon the evaluation. Generally, a tile can be encoded into a data format in order to magnify an advantage of a particular file format while mitigating a deficiency of a file format.

At reference numeral 806, the tile within the encoded file format can be communicated for rendering by a browser. In one example, a browser or client can request a tile in order to initiate communication. The request can be for a particular tile in an image file format and either the requested tile in the image file format can be communicated or the tile in a selected or encoded image file format. In another example, a manifest can be communicated to the browser or client, which can include file format definitions for tiles associated with the image. In still another example, the tile can be formatted into a generic file extension in order to be utilized by a browser or client.

FIG. 9 illustrates a method 900 for efficiently rendering a plurality of images by leveraging advantages of two or more file formats. At reference numeral 902, content of a tile can be analyzed, wherein the tile is a representative portion of at least one of a map image or a map overlay. For example, a map image or map overlay can be partitioned into smaller portions referred to as tiles. At reference numeral 904, the tile can be encoded into a PNG file format if the analyzed content includes a portion of a transparent region. At reference numeral 906, the tile can be encoded into a JPEG file format if the analyzed content includes a substantial portion of opaqueness. In one example, if the entire tile content is opaque, the tile can be encoded as a JPEG file format.

At reference numeral 908, the tile can be formatted into a generic file extension. The generic file extension can be any suitable file extension that is not affiliated with at last one of an application, a portion of software, a portion of hardware, a device, etc. In other words, the tile can include the generic file extension that can be a common ambiguous extension or server type label that does not designate the data (e.g., the tile) with a particular data type. At reference numeral 910, the generic file extension can be automatically translated within a browser in order to identify the file format for the tile. At reference numeral 912, the tile can be rendered for display within the encoded file format.

Figure 10:
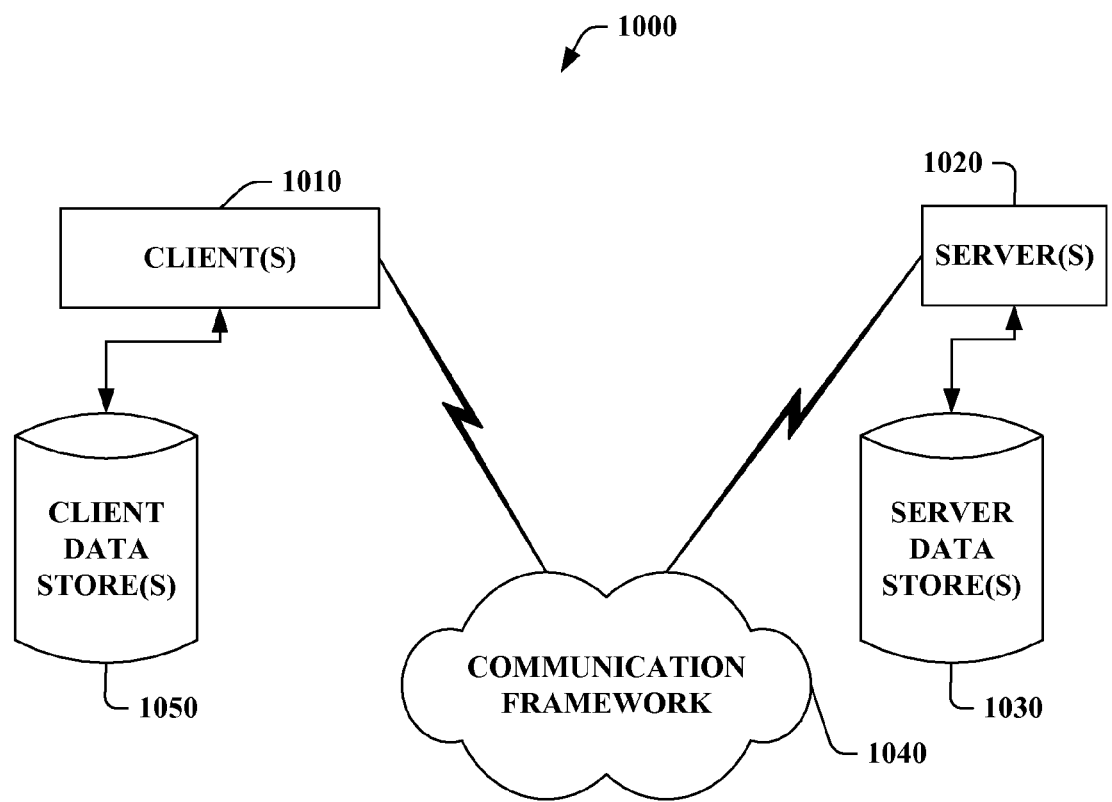
FIG. 10 illustrates an exemplary networking environment, wherein the novel aspects of the claimed subject matter can be employed.
Figure 11:
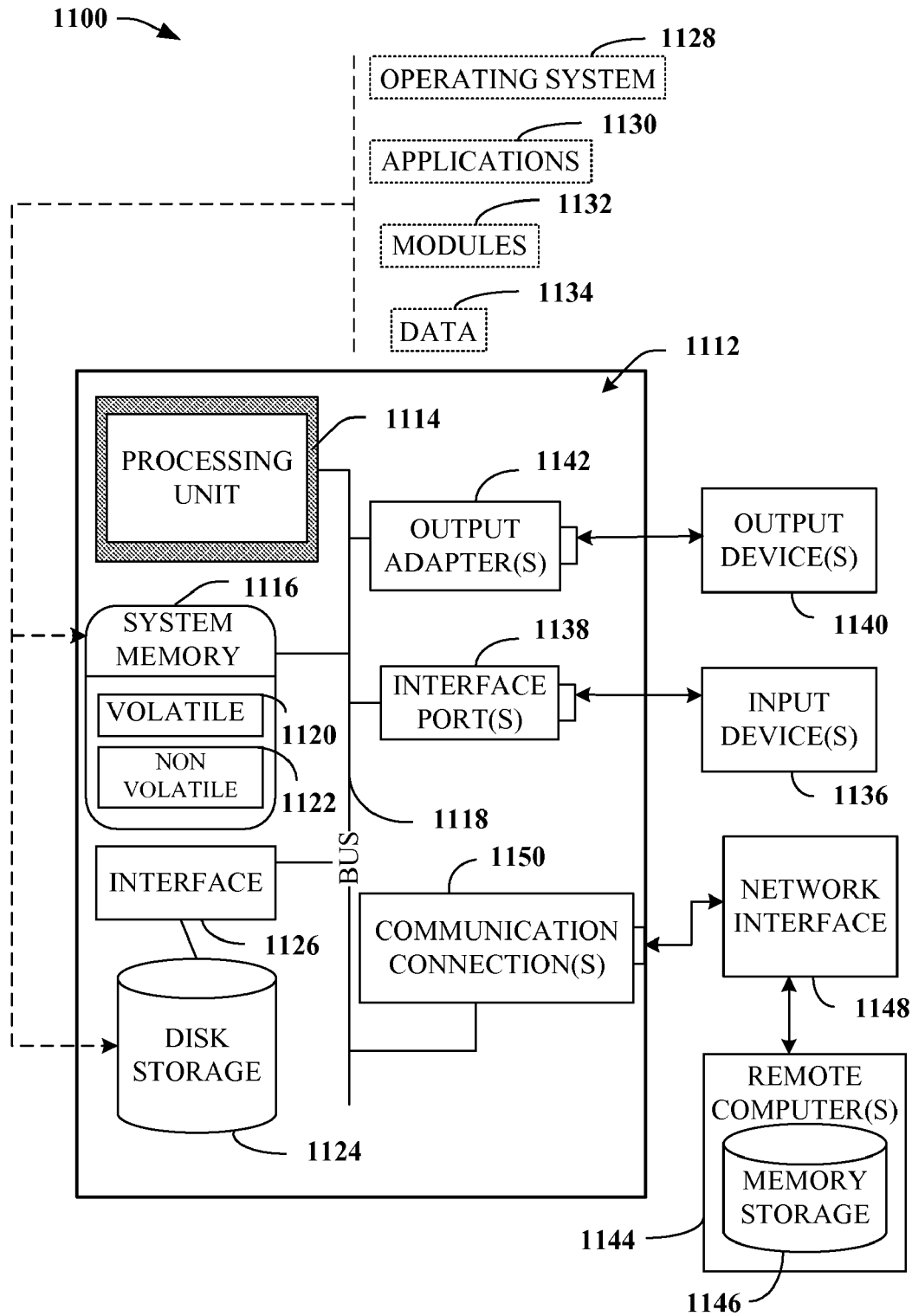
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For example, a tile generator that can select a file format for an image or data based at least in part upon advantageous characteristics associated therewith, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method comprising:
analyzing content of a tile, the tile being representative of at least one of a map image or a map overlay;
selectively encoding the tile into an encoded file format comprising a first format that has transparency ability or a second format that does not have transparency ability, the selectively encoding comprising:
when the analyzed content includes a portion of a transparent region, selectively encoding the tile into the first format that has the transparency ability;
when the analyzed content includes a substantial portion of opaqueness, selectively encoding the tile into the second format that does not have the transparency ability; and
communicating the tile within the encoded file format for rendering by at least one of a client or a browser.

2. The computer implemented method of claim 1, further comprising:
formatting the tile into a generic file extension; and
automatically translating the generic file extension to identify the encoded file format for the tile.

3. The computer implemented method a of claim 1, further comprising rendering the tile within the encoded file format for display.

4. The computer-implemented method of claim 1, wherein the first format is portable networks graphic (PNG) file format.

5. The computer-implemented method of claim 1, wherein the second format is joint photographic expert group (JPEG) file format.

6. The computer-implemented method of claim 1, further comprising generating a manifest or a definition set that includes a listing of the encoded file format for the tile.

7. The computer-implemented method of claim 6, the listing including another encoded file format for at least one other tile.

8. A computer-readable storage device comprising computer executable instructions that, when executed by a processing unit, cause the processing unit to perform acts comprising:
analyzing content of a tile of an image;
selectively encoding the tile into an encoded file format comprising a first format that has a transparency ability or a second format that does not have the transparency ability, the selectively encoding comprising:
when the analyzed content is transparent, selectively encoding the tile into the first format that has the transparency ability;
when the analyzed content is opaque, selectively encoding the tile into the second format that does not have the transparency ability; and
communicating the tile in the encoded file format.

9. The computer-readable storage device of claim 8, the acts further comprising: formatting the tile into a generic file extension; and automatically translating the generic file extension to identify the encoded file format for the tile.

10. The computer-readable storage device of claim 8, the acts further comprising rendering the tile.

11. The computer-readable storage device of claim 8, wherein the first format is portable networks graphic (PNG) file format.

12. The computer-readable storage device of claim 8, wherein the second format is joint photographic expert group (JPEG) file format.

13. The computer-readable storage device of claim 8, the acts further comprising generating a manifest or a definition set that includes a listing of the encoded file format for the tile.

14. The computer-readable storage device of claim 13, the acts further comprising selectively encoding at least one other tile of the image.

15. A system comprising:
a server configured to host an image that is partitioned into a plurality of tiles, the plurality of tiles collectively representing the image;
a tile generator configured to:
analyze content of an individual tile;
selectively encode the individual tile into an encoded file format comprising a first format that has a transparency ability or a second format that does not have the transparency ability, the selectively encoding comprising:
when the analyzed content is transparent, selectively encoding the tile into the first format that has the transparency ability;
when the analyzed content is opaque, selectively encoding the tile into the second format that does not have the transparency ability; and
at least one processing unit configured to execute at least the tile generator, wherein the server is further configured to communicate the tile within the encoded file format for rendering by a browser.

16. The system of claim 15, wherein the tile generator is further configured to format the individual tile into a generic file extension.

17. The system of claim 15, wherein the browser renders the individual tile.

18. The system of claim 15, wherein the first format is portable networks graphic (PNG) file format and the second format is joint photographic expert group (JPEG) file format.

19. The computer system of claim 15, wherein the server is further configured to generate a listing of encoded file formats for each of the plurality of tiles.

20. The system according to claim 15, wherein the tile generator is further configured to selectively encode at least one other tile of the plurality of tiles.

\* \* \* \* \*

UNITED STATES PATENT AND TRADEMARK OFFICE
CERTIFICATE OF CORRECTION

| | | |
|---|---|---|
| PATENT NO. | : 8,139,872 B2 | |
| APPLICATION NO. | : 12/147594 | |
| DATED | : March 20, 2012 | |
| INVENTOR(S) | : Howell et al. | |

It is certified that error appears in the above-identified patent and that said Letters Patent is hereby corrected as shown below:

IN THE CLAIMS:

In column 16, line 24, in Claim 3, delete "computer implemented method a" and insert -- computer-implemented method --, therefor.

Signed and Sealed this
Sixth Day of November, 2012

David J. Kappos
*Director of the United States Patent and Trademark Office*